United States Patent
Chien et al.

(10) Patent No.: US 11,656,909 B2
(45) Date of Patent: May 23, 2023

(54) TENSOR ACCELERATOR CAPABLE OF INCREASING EFFICIENCY OF DATA SHARING

(71) Applicant: National Taiwan University, Taipei (TW)

(72) Inventors: Shao-Yi Chien, Taipei (TW); Yu-Sheng Lin, Yunlin County (TW); Wei-Chao Chen, Taipei (TW)

(73) Assignee: National Taiwan University, Taipei (TW)

( * ) Notice: Subject to any disclaimer, the term of this patent is extended or adjusted under 35 U.S.C. 154(b) by 62 days.

(21) Appl. No.: 17/231,011

(22) Filed: Apr. 15, 2021

(65) Prior Publication Data

US 2022/0334880 A1    Oct. 20, 2022

(51) Int. Cl.
*G06F 9/50* (2006.01)
*G06F 7/57* (2006.01)
*G06F 9/54* (2006.01)

(52) U.S. Cl.
CPC .............. *G06F 9/5027* (2013.01); *G06F 7/57* (2013.01); *G06F 9/544* (2013.01)

(58) Field of Classification Search
CPC .......... G06F 9/5027; G06F 7/57; G06F 9/544; G06F 5/06
See application file for complete search history.

(56) References Cited

U.S. PATENT DOCUMENTS

| | | | | |
|---|---|---|---|---|
| 5,987,597 A * | 11/1999 | Miura | ................... | G06F 9/3001 712/228 |
| 2004/0133750 A1 * | 7/2004 | Stewart | .................... | G06F 7/575 711/148 |
| 2007/0245043 A1 * | 10/2007 | Wu | ...................... | G06F 13/1663 710/52 |
| 2009/0278567 A1 * | 11/2009 | Suzuki | ............... | H03K 19/0185 326/80 |
| 2015/0039855 A1 * | 2/2015 | Pechanek | .......... | G06F 15/17387 712/11 |
| 2015/0310311 A1 * | 10/2015 | Shi | .......................... | G06N 3/063 382/158 |
| 2021/0073170 A1 * | 3/2021 | Liao | ..................... | G06F 15/7807 |
| 2021/0132945 A1 * | 5/2021 | Mills | ...................... | G06N 3/084 |

FOREIGN PATENT DOCUMENTS

| TW | 202024960 A | 7/2020 |
|---|---|---|
| TW | 202044124 A | 12/2020 |
| TW | 202113633 A | 4/2021 |

OTHER PUBLICATIONS

Arm Ltd., "Arm Machine Learning Processor NPU", May 2019.
(Continued)

*Primary Examiner* — Farley Abad
(74) *Attorney, Agent, or Firm* — Winston Hsu (57) ABSTRACT

A tensor accelerator includes two tile execution units and a bidirectional queue. Each of the tile execution units includes a buffer, a plurality of arithmetic logic units, a network, and a selector. The buffer includes a plurality of memory cells. The network is coupled to the plurality of memory cells. The selector is coupled to the network and the plurality of arithmetic logic units. The bidirectional queue is coupled between the selectors of the tile execution units.

12 Claims, 7 Drawing Sheets

(56) References Cited

OTHER PUBLICATIONS

Rick Merritt, "ARM gives glimpse of AI core", Available on line [https://www.eetimes.com/arm-gives-glimpse-of-ai-core/], May 22, 2018.
Chen et al., "Eyeriss v2: A flexible and high-performance accelerator for emerging deep neural networks", Jul. 10, 2018.
Lin et al., "MERIT: Tensor Transform for Memory-Efficient Vision Processing on Parallel Architectures", Available on line [https://arxiv.org/pdf/1911.03458.pdf], Nov. 7, 2019.

* cited by examiner

TENSOR ACCELERATOR CAPABLE OF INCREASING EFFICIENCY OF DATA SHARING

BACKGROUND OF THE INVENTION

1. Field of the Invention

The present invention relates to a tensor accelerator, and more particularly, a tensor accelerator with a datapath capable of increasing efficiency of data sharing across multiple arithmetic logic units.

2. Description of the Prior Art

Recently, deep neural network (DNN) accelerator architectures have attracted significant attention because of their effectiveness in exploiting data-parallelism opportunities for neural network computation. Their goals are similar: pack as many arithmetic logic units as possible within the area budget, and have them run in parallel without stalling. While the density of arithmetic logic units increases along with the advancement of technology, the available DRAM bandwidth tends to grow slower than the density. Therefore, a smooth and timely supply of data to the arithmetic logic units becomes the primary goal for most modern DNN accelerators.

To make effective use of the precious yet power-hungry DRAM (dynamic random access memory) bandwidth, on-chip global buffers cache tiles of data and make them repeatedly accessible by the arithmetic logic units. As the number of arithmetic logic units grows, it is often desirable to have local buffers closer to arithmetic logic units to reduce the power and contention of repeated access to the same data. The interconnection between these buffers to the arithmetic logic units ultimately becomes the defining character of a DNN accelerator. For example, larger global buffers are more area-efficient but can become a critical path when delivering data to the arithmetic logic units. Larger local buffers, on the other hand, can provide sufficient data bandwidth to the arithmetic logic units with the drawback that the same data can occupy multiple local buffers.

In a vector processor, arithmetic logic units are clustered together to share their local buffers. The design not only prevents data duplication between local buffers but also reduces the need for a dedicated global buffer, thus avoiding data duplication between the memory hierarchies. Moreover, the data access flexibility between arithmetic logic units and local buffers also enable vector processors to support a broader range of workloads compared with other architectures. Despite these benefits, the additional crossbar between arithmetic logic units and local buffers can add significant routing complexity, which in turn limits the PE cluster size. Data sharing between different PE clusters is also non-trivial, which in turn limits data reuse opportunities across clusters.

SUMMARY OF THE INVENTION

According to an embodiment, a tensor accelerator comprises two tile execution units and a bidirectional queue. Each of the tile execution units comprises a buffer, a plurality of arithmetic logic units, a network, and a selector. The buffer comprises a plurality of memory cells. The network is coupled to the plurality of memory cells. The selector is coupled to the network and the plurality of arithmetic logic units. The bidirectional queue is coupled between the selectors of the tile execution units.

According to another embodiment, a tensor accelerator comprises three tile execution units and two bidirectional queues. Each of the tile execution units comprises a buffer, a plurality of arithmetic logic units, a network, and a selector. The buffer comprises a plurality of memory cells. The network is coupled to the plurality of memory cells. The selector is coupled to the network and the plurality of arithmetic logic units. The first bidirectional queue is coupled between the selectors of the first tile execution unit and the second tile execution unit. The second bidirectional queue is coupled between the selectors of the second tile execution unit and the third tile execution unit.

According to another embodiment, a tensor accelerator comprises five tile execution units and four bidirectional queues. Each of the tile execution units comprises a buffer, a plurality of arithmetic logic units, a network, and a selector. The buffer comprises a plurality of memory cells. The network is coupled to the plurality of memory cells. The selector is coupled to the network and the plurality of arithmetic logic units. The first bidirectional queue is coupled between the selectors of the first tile execution unit and the fifth tile execution unit. The second bidirectional queue is coupled between the selectors of the second tile execution unit and the fifth tile execution unit. The third bidirectional queue is coupled between the selectors of the third tile execution unit and the fifth tile execution unit. The fourth bidirectional queue is coupled between the selectors of the fourth tile execution unit and the fifth tile execution unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
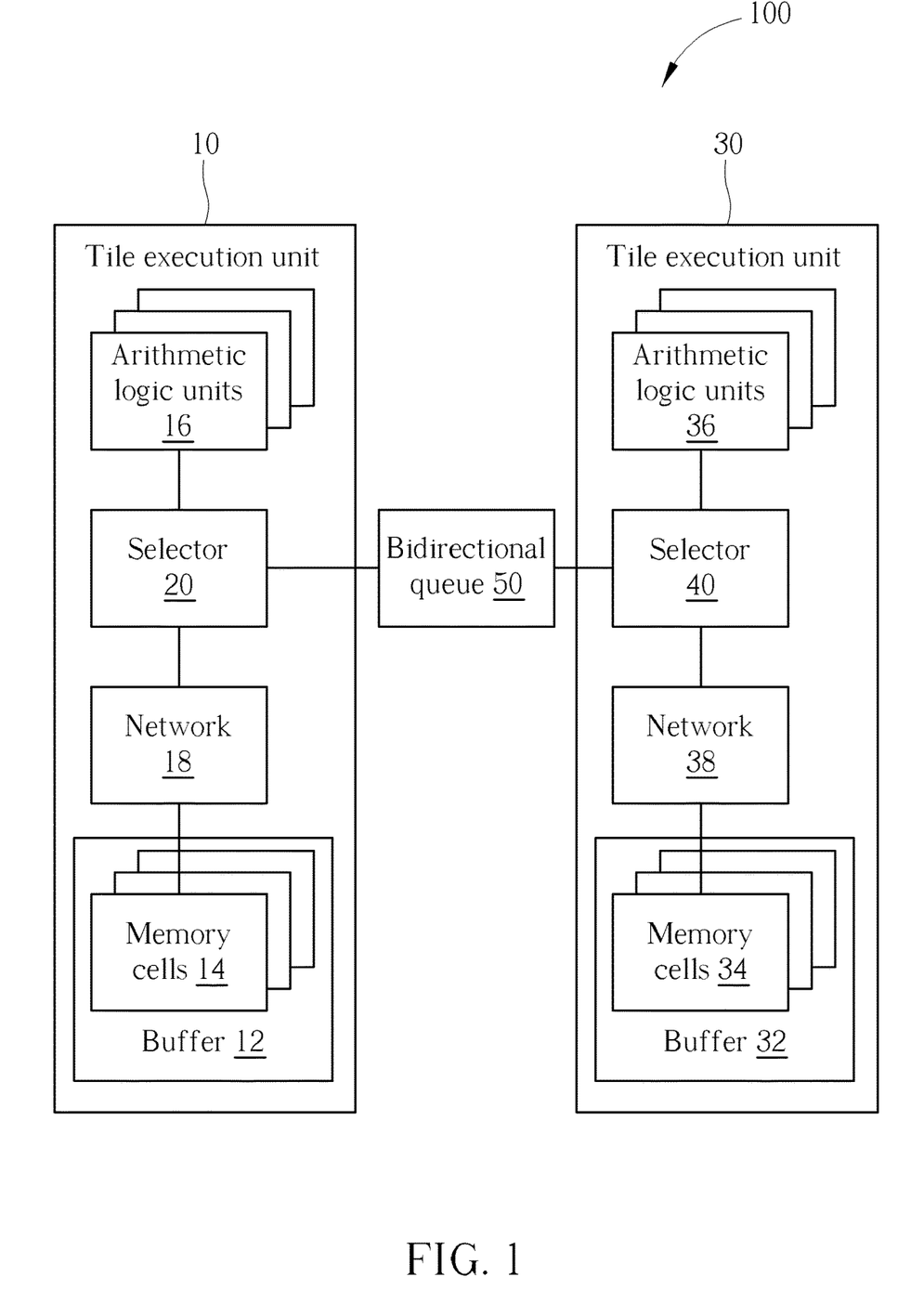
FIG. 1 is a tensor accelerator of an embodiment of the present invention.

FIG. 1 is a tensor accelerator 100 of an embodiment of the present invention. The tensor accelerator 100 comprises a tile execution unit 10, a tile execution unit 30 and a bidirectional queue 50. The tile execution unit 10 comprises a buffer 12 comprising a plurality of memory cells 14. The tile execution unit 10 further comprises a plurality of arithmetic logic units 16, a network 18 coupled to the plurality of memory cells 14, and a selector 20 coupled to the network 18 and the plurality of arithmetic logic units 16. The tile execution unit 30 comprises a buffer 32 comprising a plurality of memory cells 34. The tile execution unit 30 further comprises a plurality of arithmetic logic units 36, a network 38 coupled to the plurality of memory cells 34, and a selector 40 coupled to the network 38 and the plurality of arithmetic logic units 36. The bidirectional queue 50 is coupled between the selector 20 and the selector 40.

Figure 2:
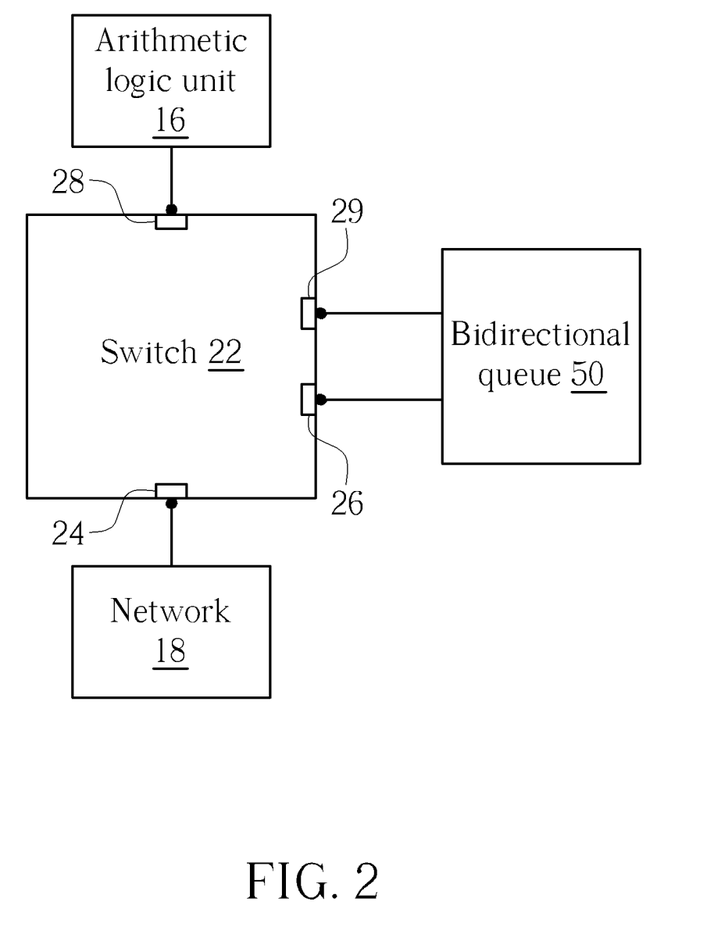
FIG. 2 shows connections of a switch of the selector 20 in FIG. 1.

FIG. 2 shows connections of a switch 22 of the selector 20 in FIG. 1. The selector 20 comprises a plurality of switches 22. Each of the switches 22 comprises an input port 24 coupled to the network 18, an input port 26 coupled to the bidirectional queue 50, an output port 28 coupled to one of the arithmetic logic units 16, and an output port 29 coupled to the bidirectional queue 50. The input port 24 is for receiving an input signal from the network 18. The input port 26 is for receiving an input signal from the bidirectional queue 50. The output port 28 is for outputting the input signal from the input port 24 or the input signal from the input port 26. The output port 29 is for outputting the input signal from the input port 24.

The networks 18, 38 each may comprise a butterfly network, a crossbar network and/or omega network. The selector 40 has a structure symmetrical to the selector 20 and is therefore not elaborated hereafter. The bidirectional queue 50 can be unidirectional at a time, and can also be bidirectional at a time. When the bidirectional queue 50 is unidirectional at a time, the bandwidth of the bidirectional queue 50 is substantially doubled.

Figure 3:
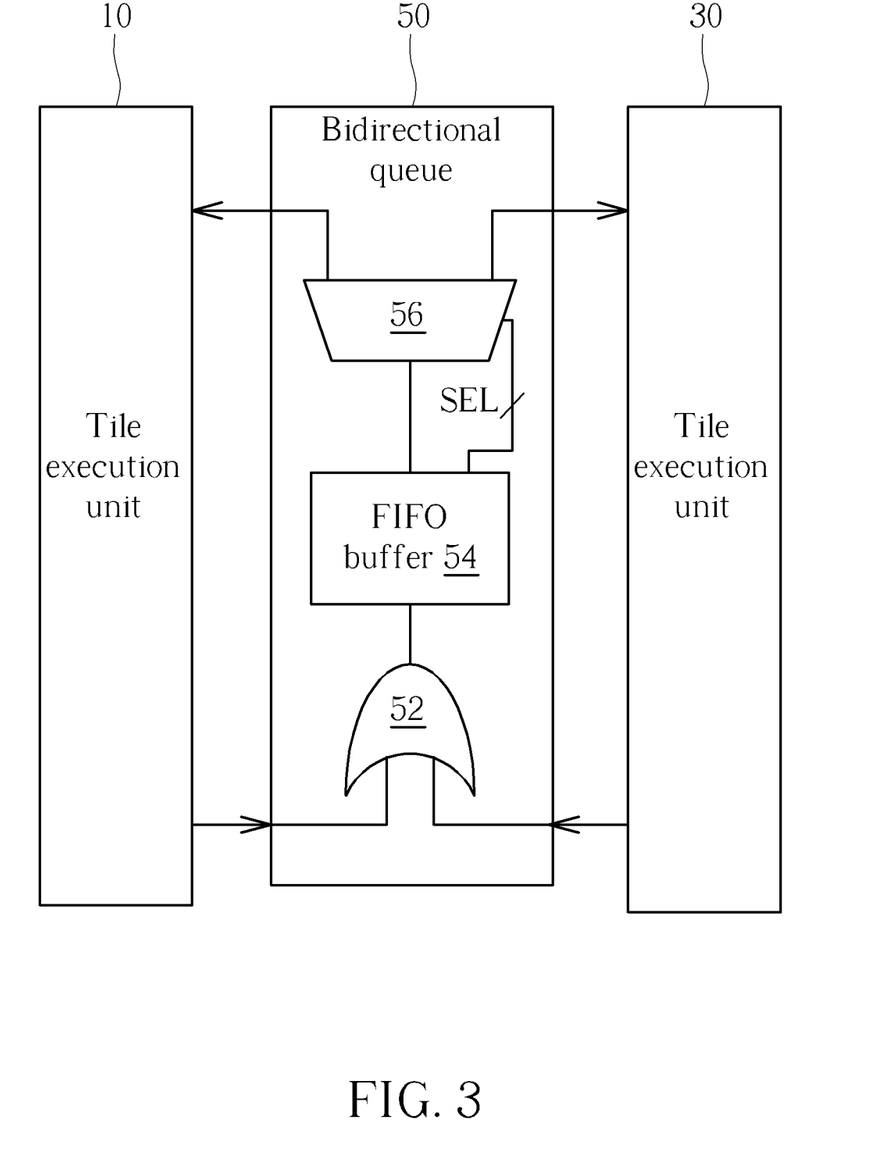
FIG. 3 shows connections of the bidirectional queue 50 of the tensor accelerator in FIG. 1.

FIG. 3 shows connections of the bidirectional queue 50 in FIG. 1. The bidirectional queue 50 may comprise an OR gate 52, a FIFO (first in first out) buffer 54 and a de-multiplexer 56. The OR gate 52 has two input ports coupled to the tile execution unit 10 and the tile execution unit 30. At one time, only one of the two input ports of the OR gate 52 would receive an input signal from the tile execution unit 10 and the tile execution unit 30 and the received input signal would be outputted to the FIFO buffer 54. The FIFO buffer 54 would then output a select signal SEL to output the received input signal to one of the tile execution units 10 and 30 which did not input the input signal to the OR gate 52. For example, if the tile execution unit 10 outputs an input signal to the OR gate 52, then the FIFO buffer 54 would output a select signal SEL to direct the input signal to the tile execution unit 30, and vice versa.

Figure 4:
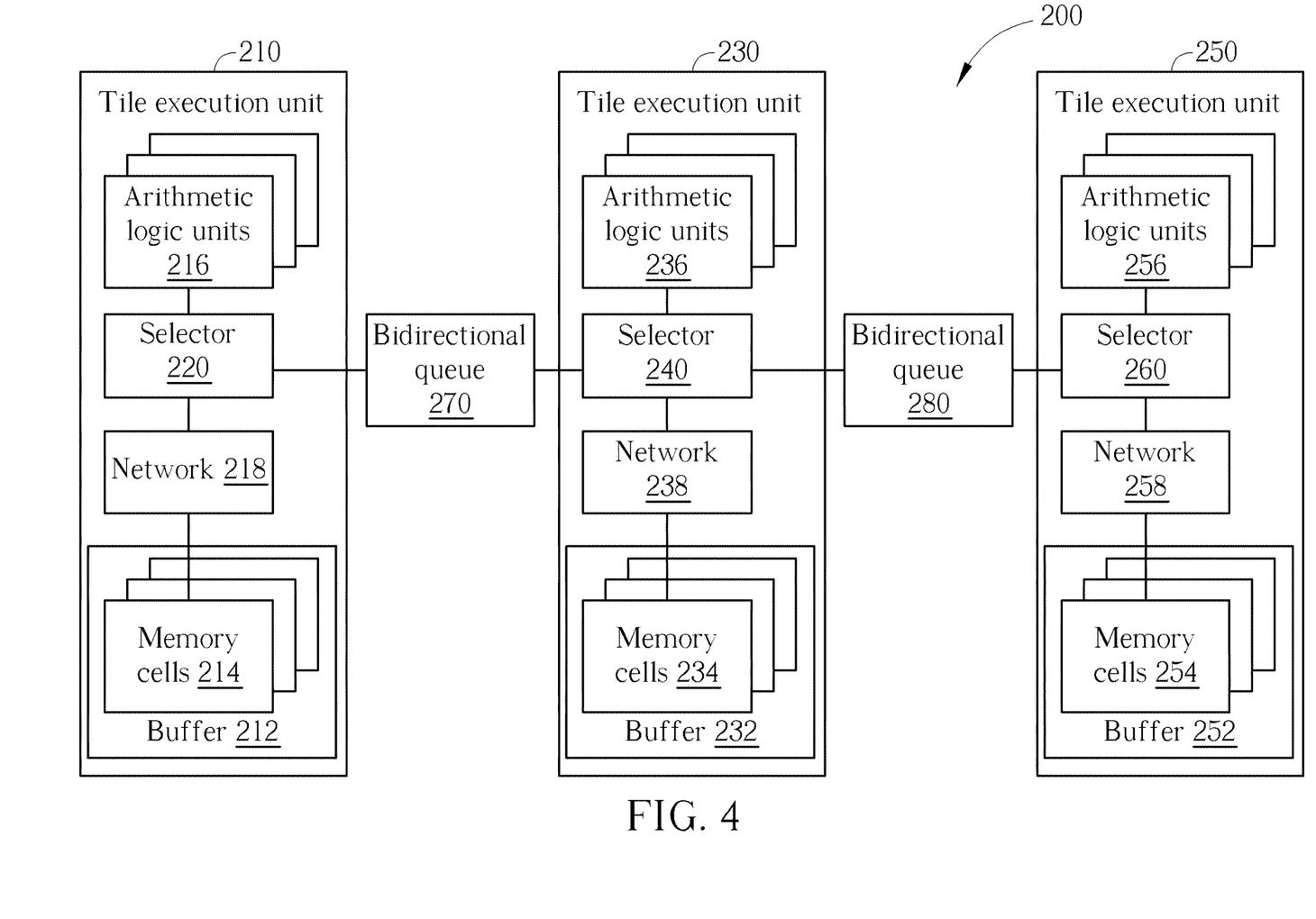
FIG. 4 is a tensor accelerator of another embodiment of the present invention.

FIG. 4 is a tensor accelerator 200 of another embodiment of the present invention. The tensor accelerator 200 comprises tile execution units 210, 230, 250 and bidirectional queues 270, 280. The tile execution unit 210 comprises a buffer 212 comprising a plurality of memory cells 214. The tile execution unit 210 further comprises a plurality of arithmetic logic units 216, a network 218 coupled to the plurality of memory cells 214, and a selector 220 coupled to the network 218 and the plurality of arithmetic logic units 216. The tile execution unit 230 comprises a buffer 232 comprising a plurality of memory cells 234. The tile execution unit 230 further comprises a plurality of arithmetic logic units 236, a network 238 coupled to the plurality of memory cells 234, and a selector 240 coupled to the network 238 and the plurality of arithmetic logic units 236. The tile execution unit 250 comprises a buffer 252 comprising a plurality of memory cells 254. The tile execution unit 250 further comprises a plurality of arithmetic logic units 256, a network 258 coupled to the plurality of memory cells 254, and a selector 260 coupled to the network 258 and the plurality of arithmetic logic units 256. The bidirectional queue 270 is coupled between the selector 220 and the selector 240. The bidirectional queue 280 is coupled between the selector 240 and the selector 260.

Figure 5:
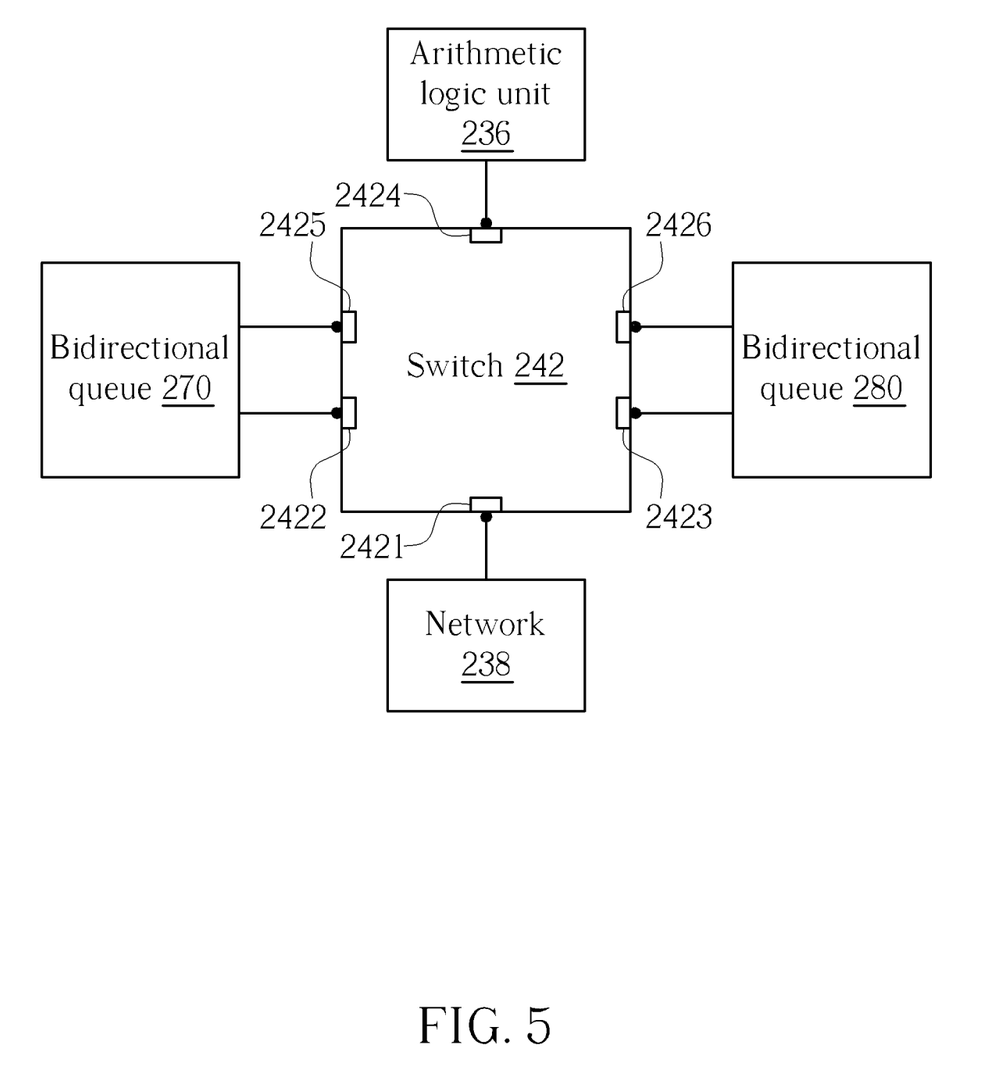
FIG. 5 shows connections of a switch of the selector 240 in FIG. 4.

FIG. 5 shows connections of a switch 242 of the selector 240 in FIG. 4. The selector 240 comprises a plurality of switches 242. Each of the switches 242 comprises input ports 2421, 2422, 2423 and output ports 2424, 2425, 2426. The input port 2421 is coupled to the network 238 for receiving an input signal from the network 238. The input port 2422 is coupled to the bidirectional queue 270 for receiving an input signal from the bidirectional queue 270. The input port 2423 is coupled to the bidirectional queue 280 for receiving an input signal from the bidirectional queue 280. The output port 2424 is coupled to one of the arithmetic logic units 236 for outputting the input signal from the input port 2421, the input signal from the input port 2422, or the input signal from the input port 2423. The output port 2425 is coupled to the bidirectional queue 270 for outputting the input signal from the input port 2421, or the input signal from the input port 2423. The output port 2426 is coupled to the bidirectional queue 280 for outputting the input signal from the input port 2421, or the input signal from the input port 2422.

Each of the selectors 220, 260 comprises a plurality of switches. Each switch of the selectors 220, 260 has a structure similar to the switch 22 in FIG. 2 and thus is not elaborated herein.

The networks 218, 238, 258 each may comprise a butterfly network, a crossbar network and/or omega network. The bidirectional queues 270, 280 each can be unidirectional at a time, and can also be bidirectional at a time. When the bidirectional queue 270, 280 is unidirectional at a time, the bandwidth of the bidirectional queue 270, 280 is substantially doubled.

Figure 6:
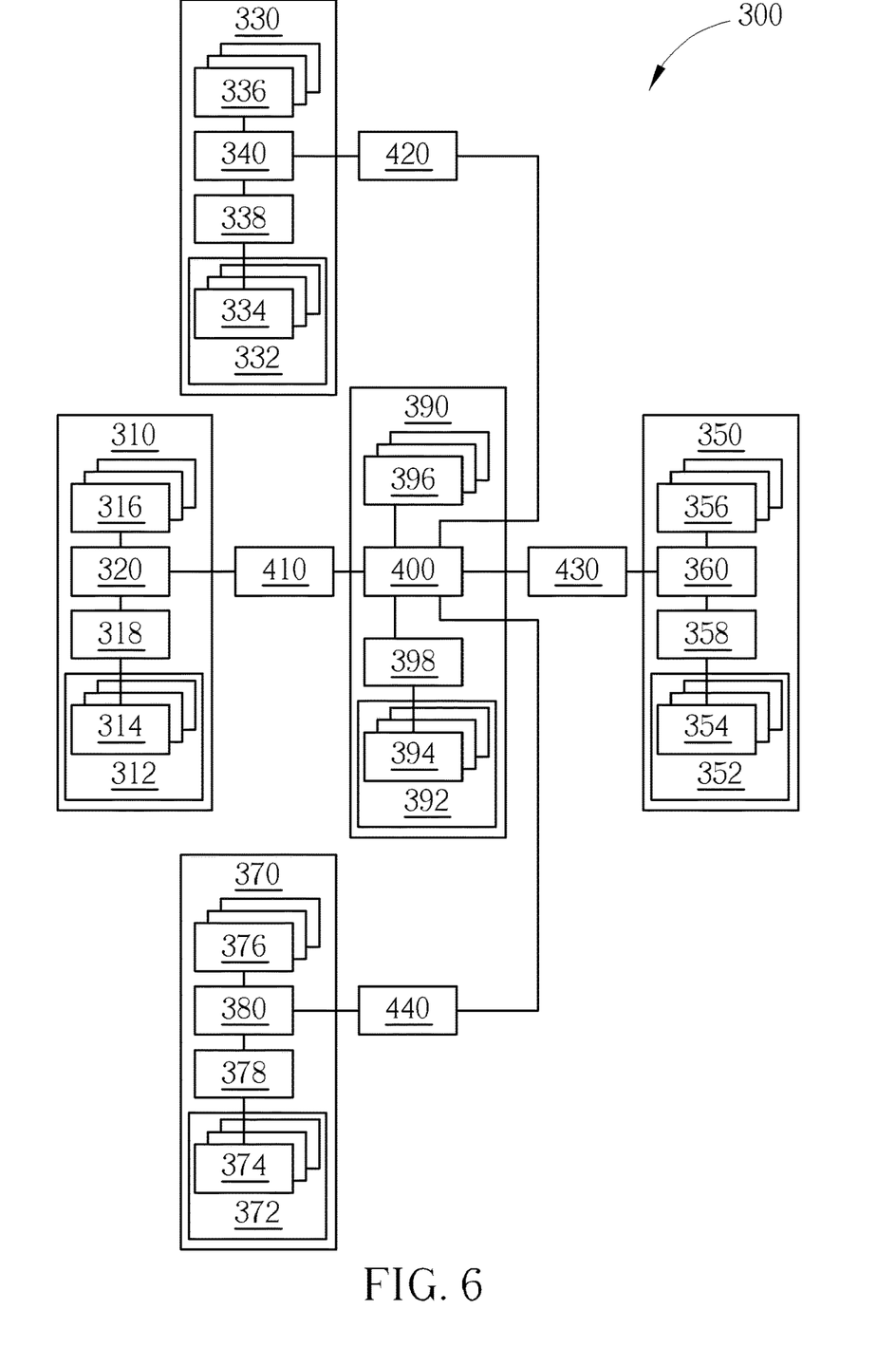
FIG. 6 is a tensor accelerator of another embodiment of the present invention.

FIG. 6 is a tensor accelerator 300 of another embodiment of the present invention. The tensor accelerator 300 comprises tile execution units 310, 330, 350, 370, 390 and bidirectional queues 410, 420, 430, 440. The tile execution unit 310 comprises a buffer 312 comprising a plurality of memory cells 314. The tile execution unit 310 further comprises a plurality of arithmetic logic units 316, a network 318 coupled to the plurality of memory cells 314, and a selector 320 coupled to the network 318 and the plurality of arithmetic logic units 316. The tile execution unit 330 comprises a buffer 332 comprising a plurality of memory cells 334. The tile execution unit 330 further comprises a plurality of arithmetic logic units 336, a network 338 coupled to the plurality of memory cells 334, and a selector 340 coupled to the network 338 and the plurality of arithmetic logic units 336. The tile execution unit 350 comprises a buffer 352 comprising a plurality of memory cells 354. The tile execution unit 350 further comprises a plurality of arithmetic logic units 356, a network 358 coupled to the plurality of memory cells 354, and a selector 360 coupled to the network 358 and the plurality of arithmetic logic units 356. The tile execution unit 370 further comprises a plurality of arithmetic logic units 376, a network 378 coupled to the plurality of memory cells 374, and a selector 380 coupled to the network 378 and the plurality of arithmetic logic units 376. The tile execution unit 390 further comprises a plurality of arithmetic logic units 396, a network 398 coupled to the plurality of memory cells 394, and a selector 400 coupled to the network 398 and the plurality of arithmetic logic units 396.

The bidirectional queue 410 is coupled between the selector 320 and the selector 400. The bidirectional queue 420 is coupled between the selector 340 and the selector 400. The bidirectional queue 430 is coupled between the selector 360 and the selector 400. The bidirectional queue 440 is coupled between the selector 380 and the selector 400.

Figure 7:
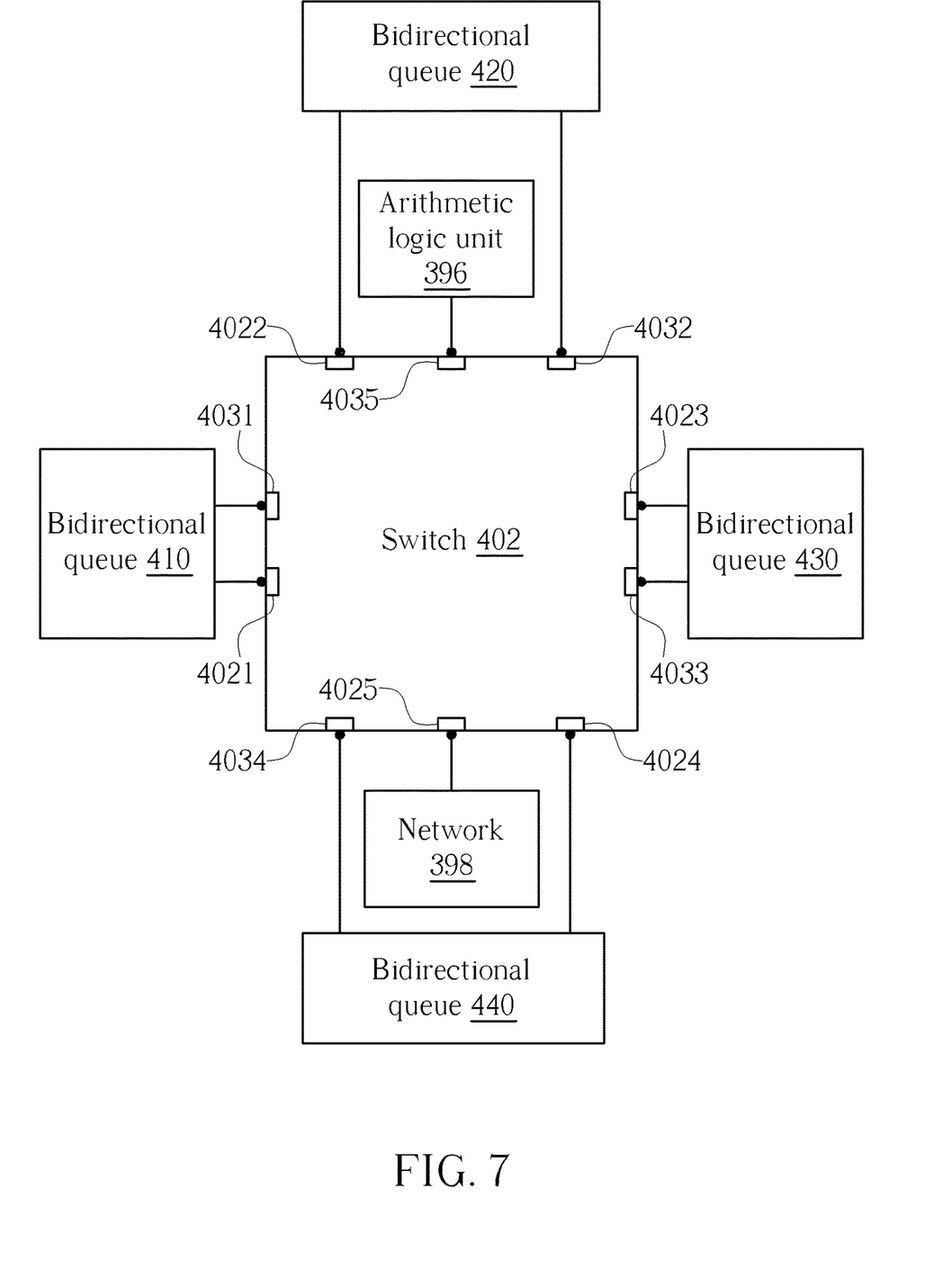
FIG. 7 shows connections of a switch of the selector 400 in FIG. 6.

FIG. 7 shows connections of a switch 402 of the selector 400 in FIG. 6. The selector 400 comprises a plurality of switches 402. Each of the switches 402 comprises input ports 4021, 4022, 4023, 4024, 4025 and output ports 4031, 4032, 4033, 4034, 4035. The input port 4021 is coupled to the bidirectional queue 410 for receiving an input signal from the bidirectional queue 410. The input port 4022 is coupled to the bidirectional queue 420 for receiving an input signal from the bidirectional queue 420. The input port 4023 is coupled to the bidirectional queue 430 for receiving an input signal from the bidirectional queue 430. The input port 4024 is coupled to the bidirectional queue 440 for receiving an input signal from the bidirectional queue 440. The input port 4025 is coupled to the network 398 for receiving an input signal from the network 398. The output port 4031 is coupled to the bidirectional queue 410 for outputting the input signal from the input port 4025, or the input signal from the input port 4023. The output port 4032 is coupled to the bidirectional queue 420 for outputting the input signal from the input port 4025, or the input signal from the input port 4024. The output port 4033 is coupled to the bidirectional queue 430 for outputting the input signal from the input port 4025, or the input signal from the input port 4021. The output port 4034 is coupled to the bidirectional queue 440 for outputting the input signal from the input port 4025, or the input signal from the input port 4022. The output port 4035 is coupled to one of the fifth arithmetic logic units 396 for outputting the input signal from the input port 4021, the input signal from the input port 4022, the input signal from the input port 4023, the input signal from the input port 4024, or the input signal from the input port 4025.

Each of the selectors 320, 340, 360, 380 comprises a plurality of switches. Each switch of the selectors 320, 340, 360, 380 has a structure similar to the switch 22 in FIG. 2 and thus is not elaborated herein.

The networks 318, 338, 358, 378, 398 each may comprise a butterfly network, a crossbar network and/or omega network. The bidirectional queues 410, 420, 430, 440 each can be unidirectional at a time, and can also be bidirectional at a time. When the bidirectional queue 410, 420, 430, 440 is unidirectional at a time, the bandwidth of the bidirectional queue 410, 420, 430, 440 is substantially doubled.

The tensor accelerators 100, 200, 300 provide a minimal amount of circuitry to share data across multiple arithmetic logic units. First, each of the switches 22 may be coupled to only one arithmetic logic unit 16 and one network 18, making it simple to implement. Second, the bidirectional queue 50 is a reversible datapath, meaning it may comprise a traditional first in first out buffer 54, making it a compact circuit unit. Third, data sharing can be implemented exactly before entering the arithmetic logic units, thus no data copy is performed in the memory cells 14, the network 18 and the selector 20, minimizing data copy and circuitry for storing data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tensor accelerator comprising:
a first tile execution unit comprising:
- a first buffer comprising a plurality of first memory cells;
- a plurality of first arithmetic logic units;
- a first network coupled to the plurality of first memory cells; and
- a first selector coupled to the first network and the plurality of first arithmetic logic units;

a second tile execution unit comprising:
- a second buffer comprising a plurality of second memory cells;
- a plurality of second arithmetic logic units;
- a second network coupled to the plurality of second memory cells; and
- a second selector coupled to the second network and the plurality of second arithmetic logic units; and a bidirectional queue coupled between the first selector and the second selector;

wherein the first selector comprises a plurality of switches each comprising:
- a first input port coupled to the first network for receiving a first input signal from the first network;
- a second input port coupled to the bidirectional queue for receiving a second input signal from the bidirectional queue;
- a first output port coupled to a first arithmetic logic unit of the first arithmetic logic units for outputting the first input signal from the first input port or the second input signal from the second input port; and
- a second output port coupled to the bidirectional queue for outputting the first input signal from the first input port.

2. The tensor accelerator of claim 1 wherein the first network comprises a butterfly network, a crossbar network and/or omega network.

3. The tensor accelerator of claim 1 wherein the bidirectional queue is unidirectional at a time.

4. The tensor accelerator of claim 1 wherein the bidirectional queue is bidirectional at a time.

5. A tensor accelerator comprising:
a first tile execution unit comprising:
- a first buffer comprising a plurality of first memory cells;
- a plurality of first arithmetic logic units;
- a first network coupled to the plurality of first memory cells; and
- a first selector coupled to the first network and the plurality of first arithmetic logic units;

a second tile execution unit comprising:
- a second buffer comprising a plurality of second memory cells;
- a plurality of second arithmetic logic units;
- a second network coupled to the plurality of second memory cells; and
- a second selector coupled to the second network and the plurality of second arithmetic logic units;

a third tile execution unit comprising:
- a third buffer comprising a plurality of third memory cells;
- a plurality of third arithmetic logic units;
- a third network coupled to the plurality of third memory cells; and
- a third selector coupled to the third network and the plurality of third arithmetic logic units;

a first bidirectional queue coupled between the first selector and the second selector; and
a second bidirectional queue coupled between the second selector and the third selector;
wherein the second selector comprises a plurality of switches each comprising:
  a first input port coupled to the second network for receiving a first input signal from the second network;
  a second input port coupled to the first bidirectional queue for receiving a second input signal from the first bidirectional queue;
  a third input port coupled to the second bidirectional queue for receiving a third input signal from the second bidirectional queue;
  a first output port coupled to a second arithmetic logic unit of the second arithmetic logic units for outputting the first input signal from the first input port, the second input signal from the second input port, or the third input signal from the third input port;
  a second output port coupled to the first bidirectional queue for outputting the first input signal from the first input port, or the third input signal from the third input port; and
  a third output port coupled to the second bidirectional queue for outputting the first input signal from the first input port, or the second input signal from the second input port.

6. The tensor accelerator of claim 5 wherein the second network comprises a butterfly network, a crossbar network and/or omega network.

7. The tensor accelerator of claim 5 wherein the first bidirectional queue is unidirectional at a time.

8. The tensor accelerator of claim 5 wherein the bidirectional queue is bidirectional at a time.

9. A tensor accelerator comprising:
a first tile execution unit comprising:
  a first buffer comprising a plurality of first memory cells;
  a plurality of first arithmetic logic units;
  a first network coupled to the plurality of first memory cells; and
  a first selector coupled to the first network and the plurality of first arithmetic logic units;
a second tile execution unit comprising:
  a second buffer comprising a plurality of second memory cells;
  a plurality of second arithmetic logic units;
  a second network coupled to the plurality of second memory cells; and
  a second selector coupled to the second network and the plurality of second arithmetic logic units;
a third tile execution unit comprising:
  a third buffer comprising a plurality of third memory cells;
  a plurality of third arithmetic logic units;
  a third network coupled to the plurality of third memory cells; and
  a third selector coupled to the third network and the plurality of third arithmetic logic units;
a fourth tile execution unit comprising:
  a fourth buffer comprising a plurality of fourth memory cells;
  a plurality of fourth arithmetic logic units;
  a fourth network coupled to the plurality of fourth memory cells; and
  a fourth selector coupled to the fourth network and the plurality of fourth arithmetic logic units;
a fifth tile execution unit comprising:
  a fifth buffer comprising a plurality of fifth memory cells;
  a plurality of fifth arithmetic logic units;
  a fifth network coupled to the plurality of fifth memory cells; and
  a fifth selector coupled to the fifth network and the plurality of fifth arithmetic logic units;
a first bidirectional queue coupled between the fifth selector and the first selector;
a second bidirectional queue coupled between the fifth selector and the second selector;
a third bidirectional queue coupled between the fifth selector and the third selector; and
a fourth bidirectional queue coupled between the fifth selector and the fourth selector;
wherein the fifth selector comprises a plurality of switches each comprising:
  a first input port coupled to the first bidirectional queue for receiving a first input signal from the first bidirectional queue;
  a second input port coupled to the second bidirectional queue for receiving a second input signal from the second bidirectional queue;
  a third input port coupled to the third bidirectional queue for receiving a third input signal from the third bidirectional queue;
  a fourth input port coupled to the fourth bidirectional queue for receiving a fourth input signal from the fourth bidirectional queue;
  a fifth input port coupled to the fifth network for receiving a fifth input signal from the fifth network;
  a first output port coupled to the first bidirectional queue for outputting the fifth input signal from the fifth input port, or the third input signal from the third input port;
  a second output port coupled to the second bidirectional queue for outputting the fifth input signal from the fifth input port, or the fourth input signal from the fourth input port;
  a third output port coupled to the third bidirectional queue for outputting the fifth input signal from the fifth input port, or the first input signal from the first input port;
  a fourth output port coupled to the fourth bidirectional queue for outputting the fifth input signal from the fifth input port, or the second input signal from the second input port; and
  a fifth output port coupled to a fifth arithmetic logic unit of the fifth arithmetic logic units for outputting the first input signal from the first input port, the second input signal from the second input port, the third input signal from the third input port, the fourth input signal from the fourth input port, or the fifth input signal from the fifth input port.

10. The tensor accelerator of claim 9 wherein the fifth network comprises a butterfly network, a crossbar network and/or omega network.

11. The tensor accelerator of claim 9 wherein the first bidirectional queue is unidirectional at a time.

12. The tensor accelerator of claim 9 wherein the bidirectional queue is bidirectional at a time.

* * * * *